United States Patent [19]

Benschneider

[11] Patent Number: 6,028,452
[45] Date of Patent: Feb. 22, 2000

[54] METHOD AND APPARATUS FOR A FAST VARIABLE PRECEDENCE PRIORITY ENCODER WITH OPTIMIZED ROUND ROBIN PRECEDENCE UPDATE SCHEME

[75] Inventor: Bradley James Benschneider, Lancaster, Mass.

[73] Assignee: Digital Equipment Corporation, Maynard, Mass.

[21] Appl. No.: 09/031,943

[22] Filed: Feb. 27, 1998

[51] Int. Cl.[7] ........................................ G11C 8/00
[52] U.S. Cl. ........................................ 326/106
[58] Field of Search ............... 326/49, 50, 37, 326/38, 105, 106, 107, 108

[56] References Cited

U.S. PATENT DOCUMENTS

| | | | |
|---|---|---|---|
| 5,321,640 | 6/1994 | Anderson et al. | 364/715.1 |
| 5,511,222 | 4/1996 | Shiba et al. | 395/800 |
| 5,519,881 | 5/1996 | Yoshida et al. | 395/800 |
| 5,555,397 | 9/1996 | Sasama et al. | 395/485 |
| 5,564,118 | 10/1996 | Steely, Jr. et al. | 395/375 |
| 5,568,485 | 10/1996 | Chaisermartin | 370/85.6 |
| 5,602,545 | 2/1997 | Ishii et al. | 341/50 |
| 5,714,949 | 2/1998 | Watabe | 341/67 |

OTHER PUBLICATIONS

Yeh, T., et al., "Two–Level Adaptive Training Branch Prediction," (1991).

Keller, J. et al., "A Superscaler Alpha Processor with Out–of–Order Execution," *Microprocessor Forum*, (Oct. 1996).

Gwennap, L., "Digital 21264 Sets New Standard—Clock Speed, Complexity, Performance Surpass Records, But Still a Year Away," *Microprocessor Report*, 10 (14):1–11, (Oct. 28, 1996).

Gieseke, B. A., et al., "A 600 MHz Superscaaler RISC Microprocessor With Out–of–Order Execution," IEEE International Solid–State Circuits Conference, (1997).

Emer, J., et al., "A Language for Describing Predictors and its Application to Automatic Synthesis," (undated).

*Primary Examiner*—Michael Tokar
*Assistant Examiner*—Don Phu Le
*Attorney, Agent, or Firm*—Hamilton, Brook, Smith & Reynolds, P.C.

[57] ABSTRACT

A variable precedence priority encoder apparatus is provided having a plurality of inputs, each receiving a corresponding bit of an input vector, and a like plurality of outputs. Each output is associated with a corresponding one of the plurality of inputs, thereby forming a plurality of input/output pairs. The encoder circuit also includes a priority assignment circuit coupling each input of the plurality of inputs to its associated corresponding output of the plurality of outputs. The priority assignment circuit assigns a priority to each input/output pair, such that an output, which corresponds to an input which receives an asserted bit, and which has a highest priority, provides an asserted bit while all other outputs provide bits that are not asserted. The priority assigned to each input can be dynamically updated within the priority assignment circuit. Updates of priority that shift the priority position by one or more inputs can be done all using the same circuit. As such, the invention overcomes the limitations of the prior art by being reconfigurable into any precedence configuration using just a single encoder circuit.

18 Claims, 11 Drawing Sheets

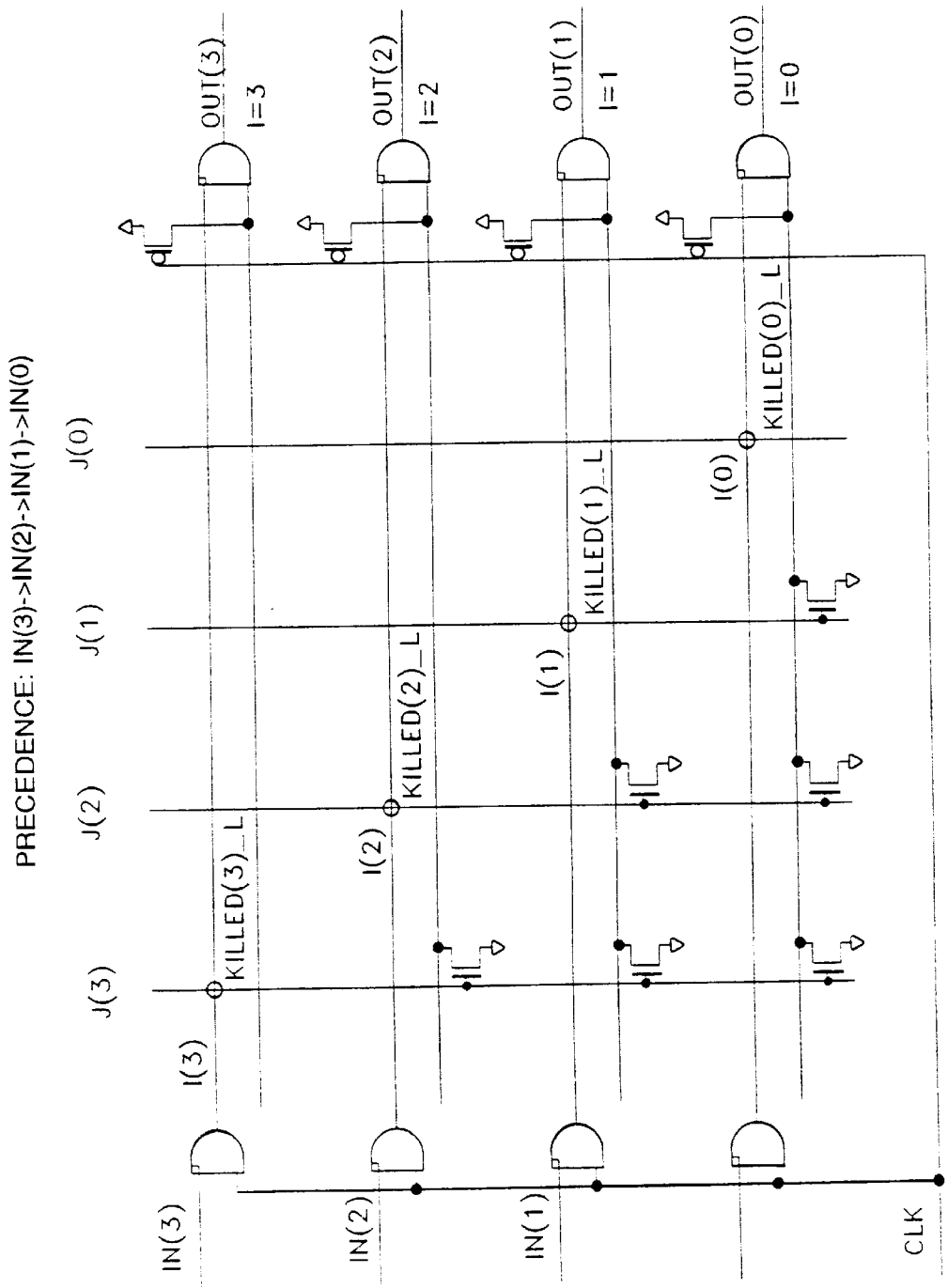
Fig. 3-a PRIOR ART

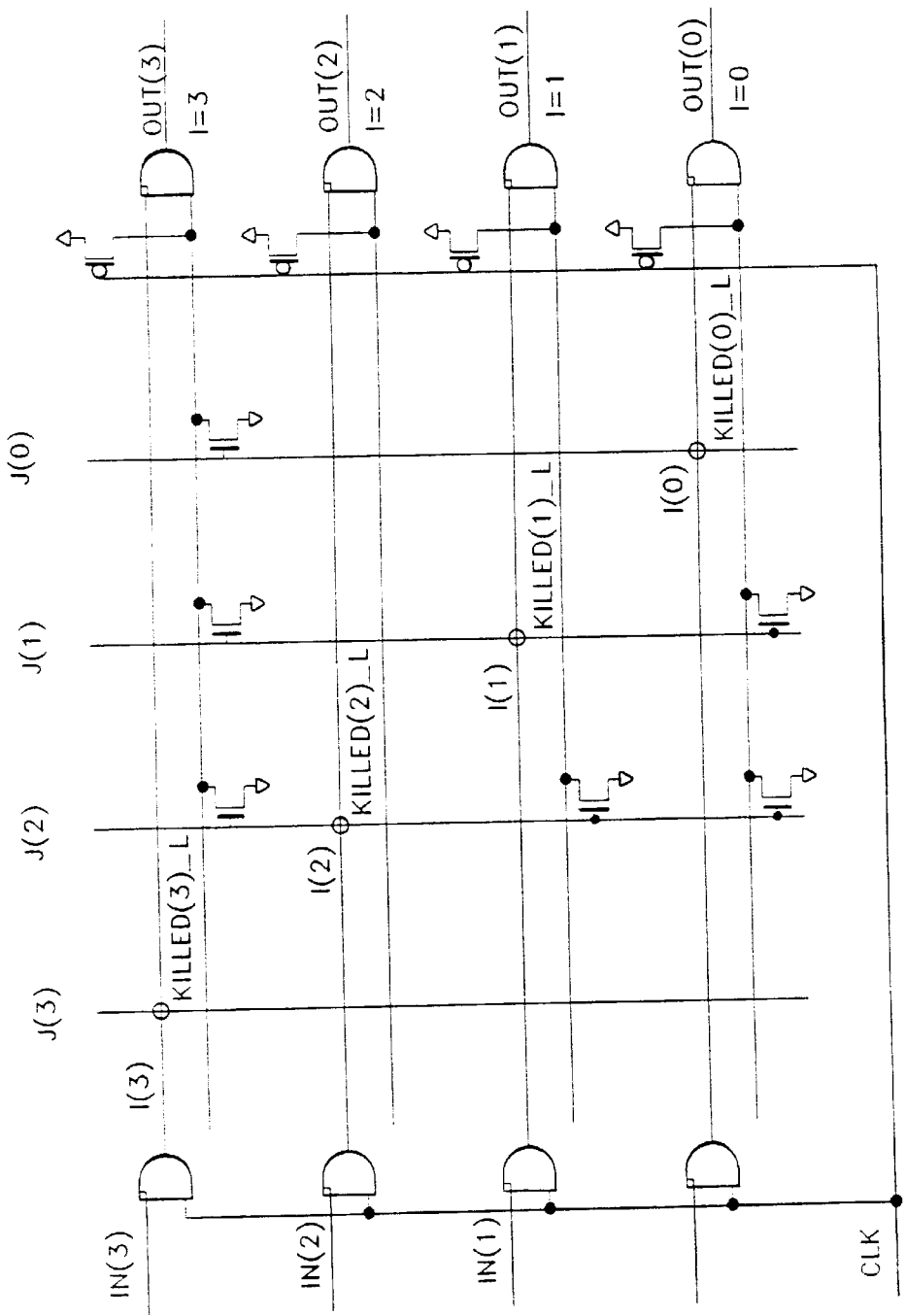
Fig. 3-b PRIOR ART

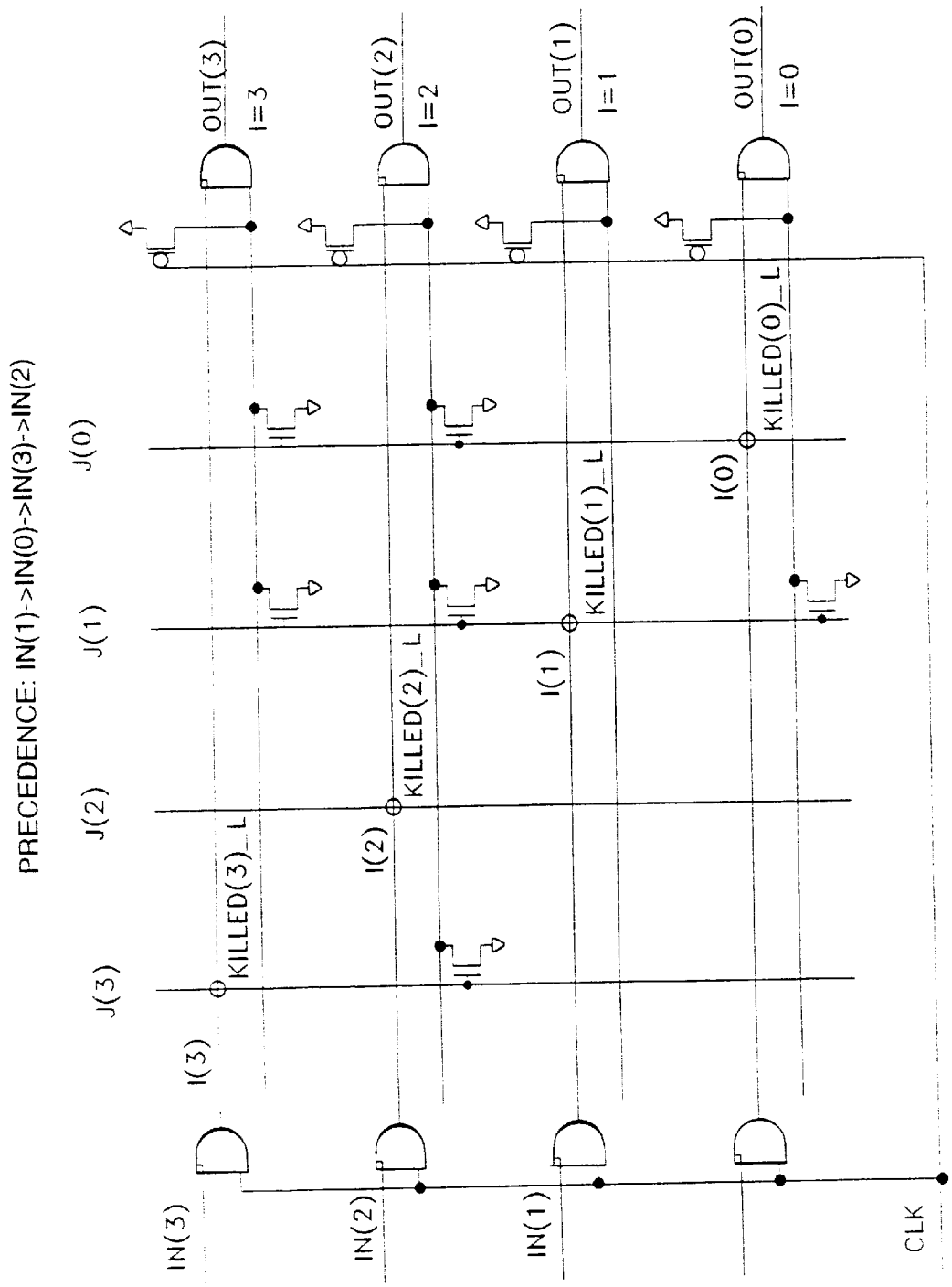
Fig. 3-C PRIOR ART

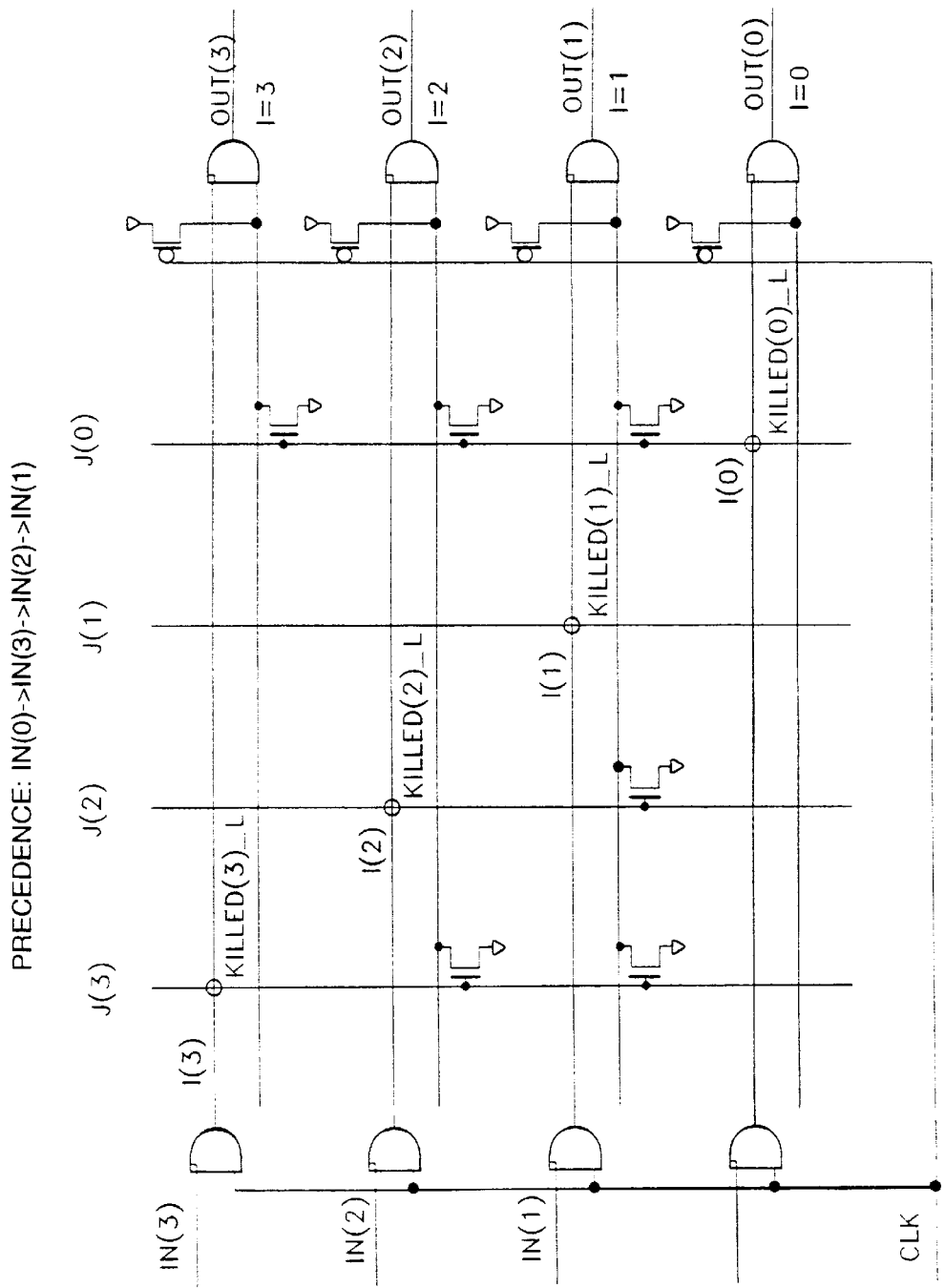
Fig. 3-d PRIOR ART

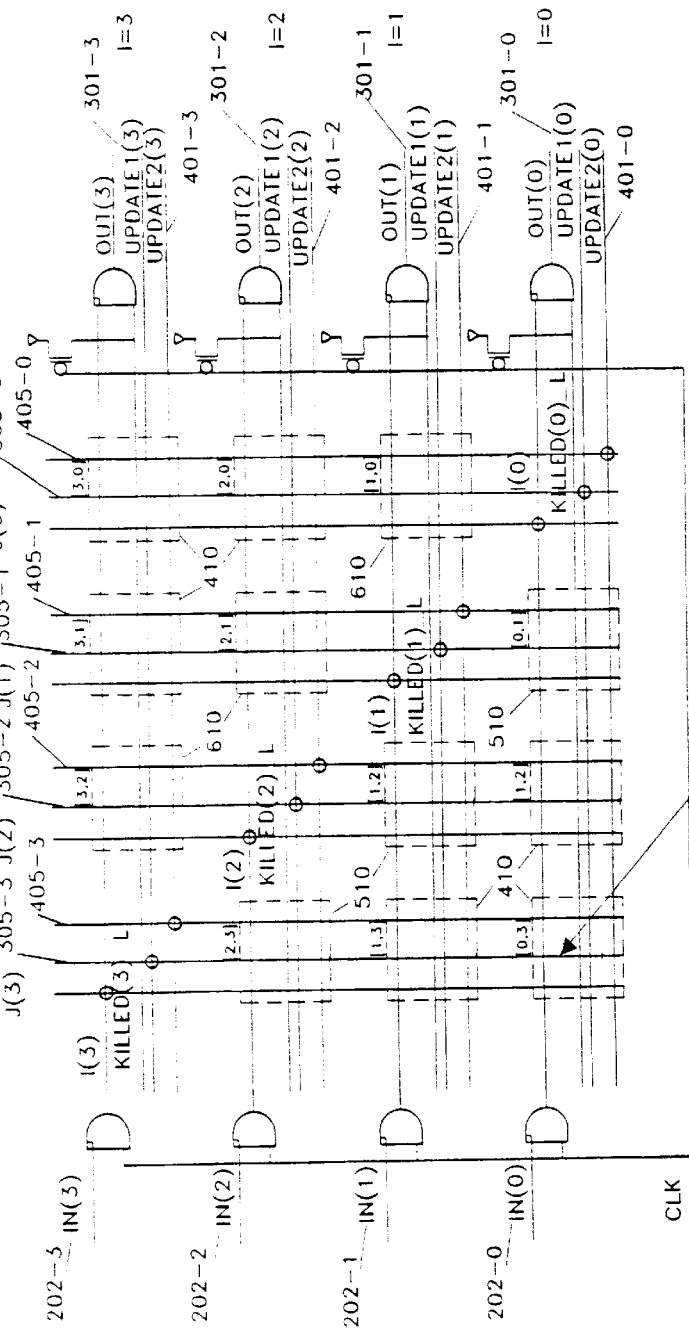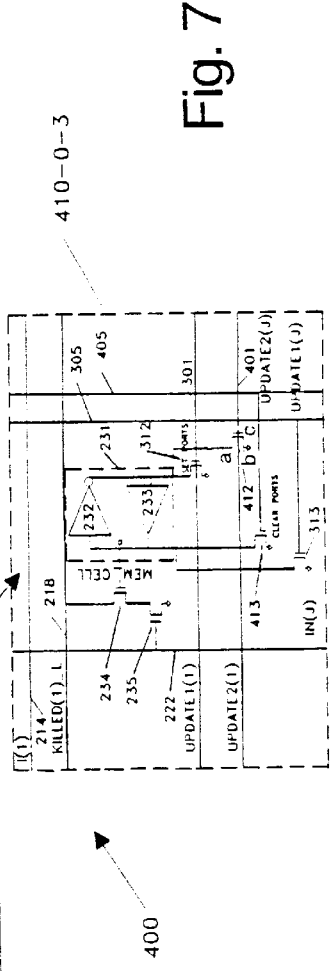
Fig. 7

METHOD AND APPARATUS FOR A FAST VARIABLE PRECEDENCE PRIORITY ENCODER WITH OPTIMIZED ROUND ROBIN PRECEDENCE UPDATE SCHEME

FIELD OF THE INVENTION

This invention relates to digital logic circuits and in particular to a variable precedence priority encoder.

BACKGROUND OF THE INVENTION

A priority encoder is a digital circuit which selects one of several input bits to remain asserted at a set of corresponding outputs, with all other output bits remaining deasserted. In the prior art, the logic decision as to which bit should remain asserted is typically based on a predefined, fixed priority or precedence of the bit positions.

For instance, in a four bit fixed priority encoder having input bits IN(3), IN(2), IN(1) and IN(0), the circuit could be constructed so that the most significant input bit IN(3) has the highest priority, followed by bit IN(2), followed by bit IN(1), and ending with bit IN(0) having the lowest priority. If, for example, an input vector has bit IN(3) deasserted and bits IN(2), IN(1) and IN(0) asserted (i.e., an input of 0111), this priority encoder will produce an output bit vector 0100. Even though input bit IN(3) has the highest priority, its corresponding output OUT(3) is deasserted since it was deasserted at the input. Output OUT(2) is asserted, however, since it corresponds to the input having the highest priority of all asserted input bits. Also, in this example, outputs OUT(1) and OUT(0) are deasserted, since they are associated with a lower priority input than the highest priority asserted input.

Priority encoders are used in a number of critical applications such as instruction queue structures within high performance data processors. This type of priority encoder provides fast arbitration between events occurring in the queue. For example, the queue typically holds multiple pending instructions which require access to a given processor resource. Therefore, only one instruction can be granted access to the resource at a time as selected by a priority encoder. Priority encoders are also used in datapath structures where the characteristics of the data itself are used to control datapath flow, such as in normalization circuits used in a floating point processor.

Traditional queue structures such as those used in data processors are organized with a fixed priority, with one queue entry pre-allocated in hardware to have the highest priority, an adjacent entry the next highest priority, and so on. As such, these encoders always use the same precedence.

In the prior art, there are two circuit configurations typically used to build fixed priority encoders. FIG. 1 illustrates a first type of fixed priority encoder 100 which employs a carry chain circuit 101. Input bit IN(3)_L is the highest priority input, followed by IN(2)_L, IN(1)_L, and then IN(0)_L. In this circuit, the input signal sense is inverted; that is, a low voltage input signal indicates an asserted or logic true input, as indicated by the notation "_L".

In operation, the carry chain 101 is pre-charged during a low phase of a clock signal (CLK) 102 by pre-charge transistors 103a through 103e. This places nodes ZZ(3) through ZZ(0) into an initial high state. After input vector reception, the clock signal (CLK) 102 enters the high state which turns off pre-charge transistors 103a through 103e, and turns on transistor 104, which creates a conductive path from node VGND 107 to a reference ground voltage. This inserts a zero bit into one end of the chain (i.e., grounding one end) to define the bit position of highest priority. Then, based on the input vector applied to inputs IN(0)_L through IN(3)_L, any deasserted inputs (which will be in a high state) activate transistors 105d through 105a. The first asserted input (in a low state) which occurs to the right of node VGND 107 will stop the propagation of the VGND 107 signal (since that input's transistor 105 will not activate), causing the corresponding output to enter a high state, with all other following outputs remaining in a low state. The location where the zero bit stops propagating (i.e. the last ZZ(N) location grounded) identifies the highest priority input bit that was asserted, as indicated by a high state only at that input's corresponding output.

A second type of fixed priority encoder circuit 130 is shown in FIG. 2 having input IN(3) assigned the highest priority. Note that in this circuit the input signal logic sense is normal such that an asserted or logic true input is represented by a high voltage state or a "1".

The fixed priority encoder 130 includes a grid of wires defined by row wires I(0) through I(3) and column wires J(0) through J(3). A KILLED(I)_L wire also extends along each row wire I. If an input in a higher priority position is asserted, this input turns on a pull-down transistor connected to all lower priority KILLED(I)_L wires, thus grounding out these lines and their outputs to a deasserted state. For an output bit OUT(I) to be asserted, therefore, the corresponding input IN(I) must have been asserted, and the KILLED (I)_L wire coupled to that input IN(I) must also not have been pulled down by another higher priority input.

In operation, when clock signal (CLK) 120 is low, kill wires KILLED(3)_L through KILLED(0)_L are initialized to a high state via pullup transistors 121a through 121d which couple each kill wire to a reference voltage, Vdd. When the clock signal (CLK) 120 enters the high state with the input vector already received, the input bits IN(0) through IN(3) are logically ANDed via respective AND gates 122a through 122d, causing only the asserted input bits to be passed through to the row or "input-to-output" wires I(0) through I(3). Note that for each input-to-output wire I(0) through I(3), there is a connection to a corresponding column or input-to-kill wire J(0) through J(3). When any input-to-output wire I(N) is in a high state, the input-to-kill wire J(N) to which it is connected is, therefore, also in a high state. The connections between the input-to-output wires I(N) and the input-to-kill wires J (N) are located along the diagonal starting at the upper left corner of the grid.

Also coupled to each input-to-kill wire J(N) are respective transistors 123 through 128. Each transistor 123 through 128 is able to ground out a corresponding KILLED(I)_L wire to place an associated output OUT(I) in a deasserted state, as controlled by the corresponding input-to-kill wire J(I) from an input IN having a higher priority.

Essentially, upon assertion of a higher priority input, all KILLED(I)_L wires associated with any lower priority inputs IN are brought to a low state. At each output OUT(0) through OUT(3), each KILLED(N)_L wire is ANDed with the state of the input-to-output wire by AND gates 129a through 129d. As such, any asserted inputs IN(3) through IN(0) always have their respective outputs deasserted via a KILLED(N)_L wire which is set low by any higher priority input that was asserted.

In the fixed priority encoder in FIG. 2, in order to change the priority from the existing configuration, the grid locations of transistors 123 through 128 must change for the desired precedence. In other words, a whole new circuit must be created. FIGS. 3a through 3d illustrate four such precedence configurations or circuits.

The precedence of each priority encoder in FIGS. 3a through 3d is determined by where the transistors (unnumbered) are connected between the I(J) wires and KILLED(I)_L wires in the transistor grid array. FIG. 3a shows the transistor connections, as in FIG. 2, for a highest to lowest precedence IN(3), IN(2), IN(1) and IN(0). FIG. 3b shows the transistor connections required when the priority of inputs is IN(2), IN(1), IN(0) and IN(3), respectively. Similarly, FIG. 3c shows a precedence of IN(1), IN(0), IN(3), and IN(2), respectively and FIG. 3d shows a precedence of IN(0), IN(3), IN(2), IN(1).

SUMMARY OF THE INVENTION

The present invention provides a technique for implementing a variable precedence priority encoder. More specifically, the invention can dynamically change the precedence of the priority encoder. Thus, without implementing a new circuit and with minimal clock cycles, embodiments of this invention allow the priority of the encoder to be changed quickly and with minimal area impact on circuit design.

In particular, the present invention provides a variable precedence priority encoder having a plurality of inputs, each receiving a corresponding bit of an input vector, and at least one output. A priority assignment circuit assigns a priority to each input such that the output provides an indication of the state of the asserted input which has a highest priority of all asserted inputs. The priority assigned to each input can be varied or dynamically changed within the priority assignment circuit. As such, the variable precedence priority encoder is reconfigurable into a number of different precedence configurations.

In one specific embodiment of the invention, each of N inputs may have a corresponding output, thereby forming a plurality, N, of input/output pairs. In conjunction with these N inputs, the priority assignment circuit further includes N input-to-output wires, with one input-to-output wire associated with each input/output pair. Each input-to-output wire also has a position which is the same as the position of the associated input/output pair, and couples its associated input to the associated output of the input/output pair. There are also N kill wires, with a kill wire associated with each input/output pair and having a kill position the same as the position of the associated input/output pair. Each kill wire is also coupled to the output of the associated input/output pair. There are also N input-to-kill wires each having an input-to-kill position, with each input-to-kill wire coupled to an input-to-output wire having an input-to-output position corresponding to the input-to-kill position of the input-to-kill wire to which it is coupled. The above mentioned input-to-output, kill, and input-to-kill wires may be configured into a grid-like structure having row and column positions, for example. The grid structure allows various rows of high priority to affect rows of lower priority.

The priority circuit also includes a plurality of kill wire control circuits, groups of which are coupled along each input-to-kill wire grid location. Each kill wire control circuit is coupled between its respective input-to-kill wire and a respective kill wire. There are separate kill wire control circuits coupled along each input-to-kill wire for every kill wire having a kill position that does not correspond to the input-to-kill position of that group's respective input-to-kill wire. They are also coupled only to kill wires having kill positions equal to the positions of associated input/output pairs in which that pair's input has a lower priority than the input associated with the respective input-to-kill wire. The kill wire control circuits enable the coupling of a memory cell to the respective kill wire in order to disable an output of lower priority than the input which is desired to affect the kill wire control circuit.

Each kill wire control circuit preferably includes a memory cell capable of maintaining an asserted state and a deasserted state. The asserted and deasserted states are mutually exclusive of one another such that the memory cell is in only one state at a time. To allow the memory cell to affect its associated kill wire, a memory cell switch is provided having an input coupled to the kill wire, a control coupled to an output of the memory cell, and an output. Also included is a kill switch having a control coupled to the respective input-to-kill wire for this kill wire control circuit, an output coupled to ground, and an input coupled to the output of the memory cell switch. Using this circuit configuration, when the input-to-kill wire is asserted, the kill switch is activated allowing the memory cell to activate the memory cell switch. Hence, if the memory cell is in an asserted state, the kill wire is placed in a deasserted state, thus disabling or grounding out the respective output.

In this configuration, the priority may be changed, or updated, dynamically. More specifically, a plurality of update wires are provided, with at least one update wire associated with each input/output pair and coupled to each memory cell of the kill wire control circuits having the same row and column positions as that input/output pair. Each update wire allows the programming of asserted and deasserted states into the memory cell of a respective kill wire control circuit, such that certain kill wire control circuits are in asserted states and certain other kill wire control circuits are in deasserted states. By programming values into the memory cells via the update wires, the priority assigned to each input is updated by at least one bit position to a different priority than a previous priority. Two or more update wires can allow the invention to update the priority by two or more bit positions.

As such, a priority encoder circuit according to the invention can change to other priority configurations merely by asserting the appropriate update wire(s).

The invention also encompasses a method for changing the priority of a variable precedence priority encoder having a plurality of inputs, a like plurality of outputs, and a plurality of kill wire control circuits each containing a memory cell capable of being placed in an asserted and deasserted state. The memory cell bits are programmed to control the priority established amongst the inputs. Then, an input vector of bits is received in asserted and deasserted states, with one input vector bit per individual input. The encoder then provides an output in an asserted state, with all other outputs in a deasserted state, wherein the output in the asserted state is provided from a selection of all inputs in an asserted state, based upon the priority as established by the memory cell bits.

The method thus allows a programmable precedence to be configured with the priority encoder, at any time. The priority encoder selects, using the programmed precedence information, an asserted input bit having the highest priority input position. By being programmable, the same circuit can therefore be used for multiple priority configurations.

The variable priority encoder apparatus and method of this invention greatly simplify queue control in an out-of-order issue machine. Queues can now be implemented in which the precedence of the queue entries can constantly be changed, for example, in a round-robin manner.

Prior art arbitration circuits using fixed priority encoders are not generally applicable to such out of order queuing strategies.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3a through 3d illustrate four different prior art fixed priority encoder circuits.

FIG. 7 is a circuit diagram of a variable precedence priority encoder having a round-robin update mechanism that can update priority by more than one bit position per cycle according to the invention.

DETAILED DESCRIPTION OF THE PREFERRED EMBODIMENTS

Figure 1:
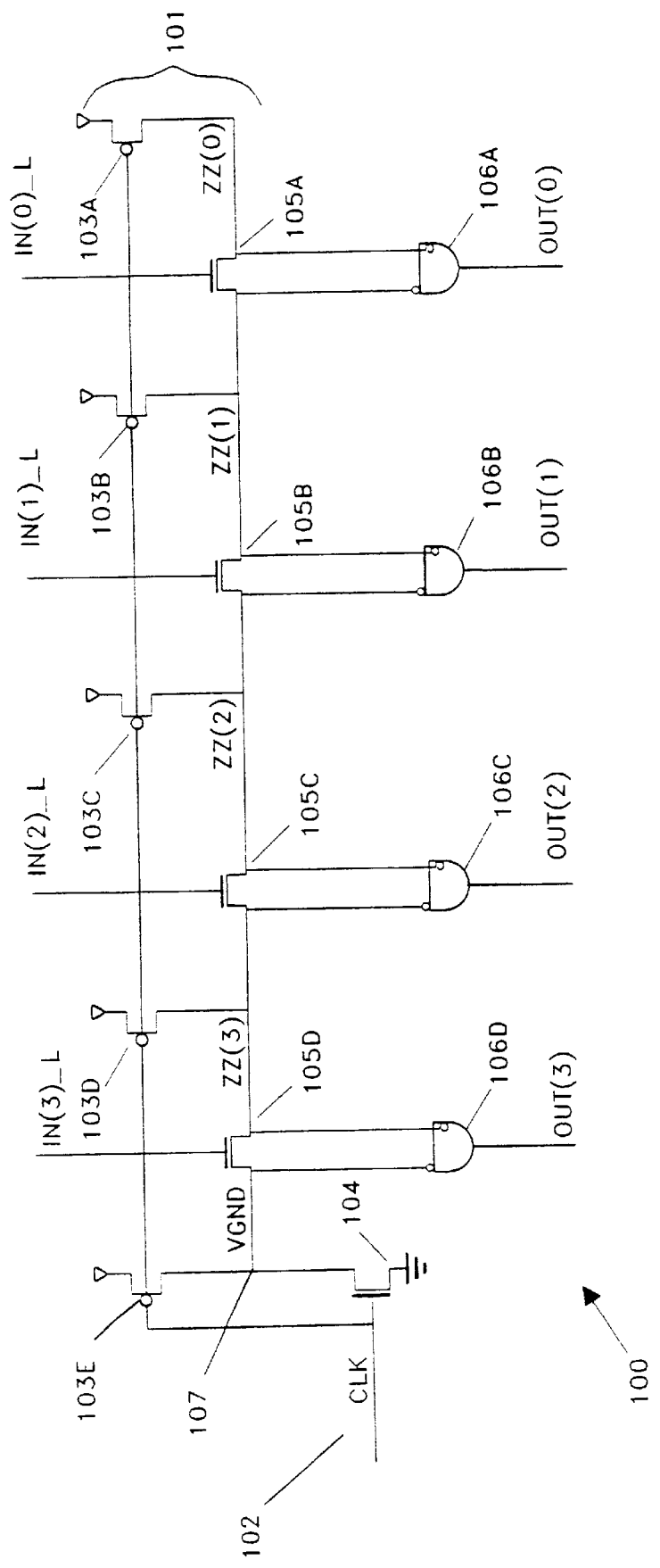
FIG. 1 is a circuit diagram of a fixed priority encoder circuit known in the prior art.
Figure 2:
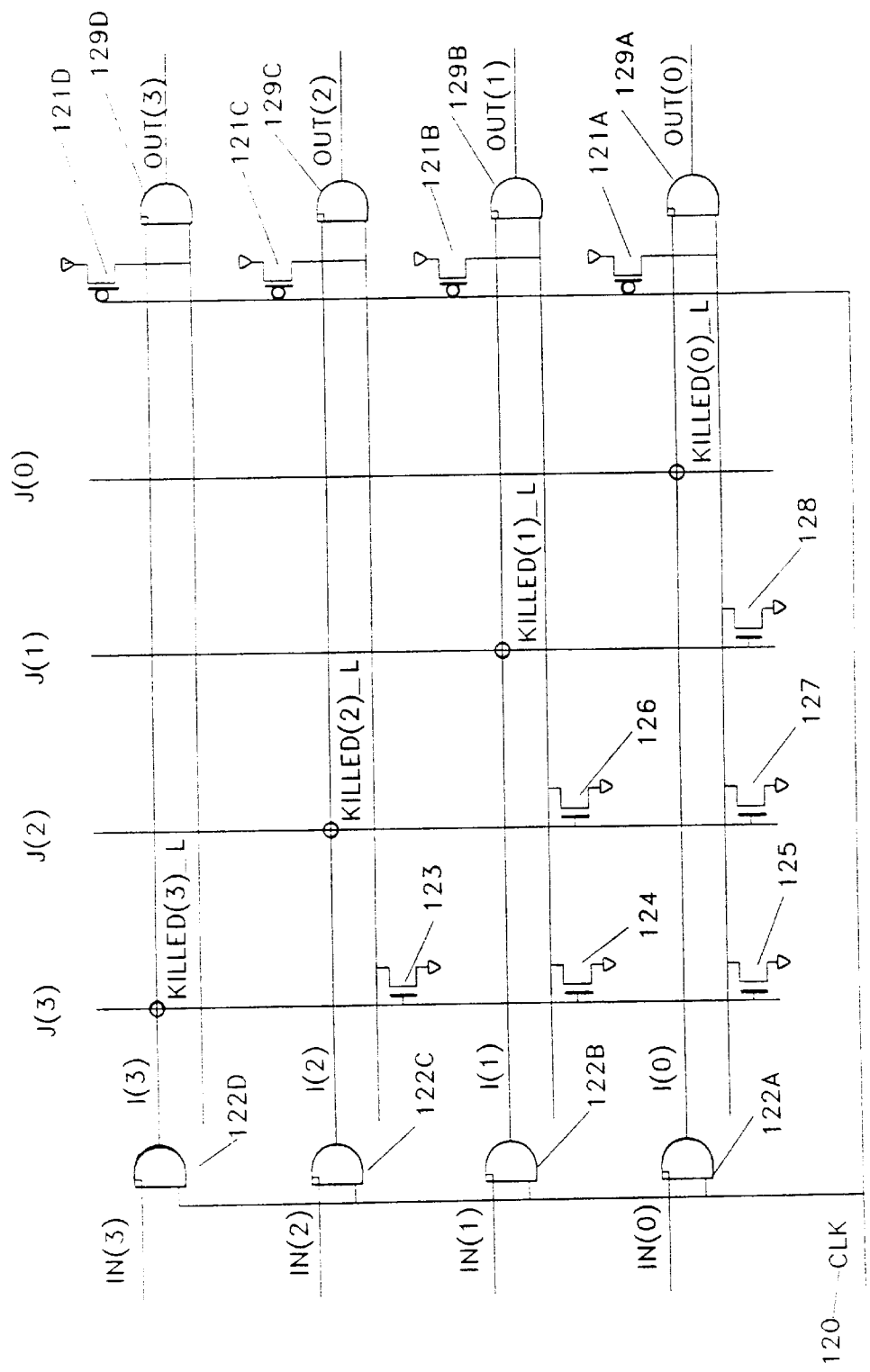
FIG. 2 is a circuit diagram of another configuration for a prior art fixed priority encoder circuit.
Figure 4:
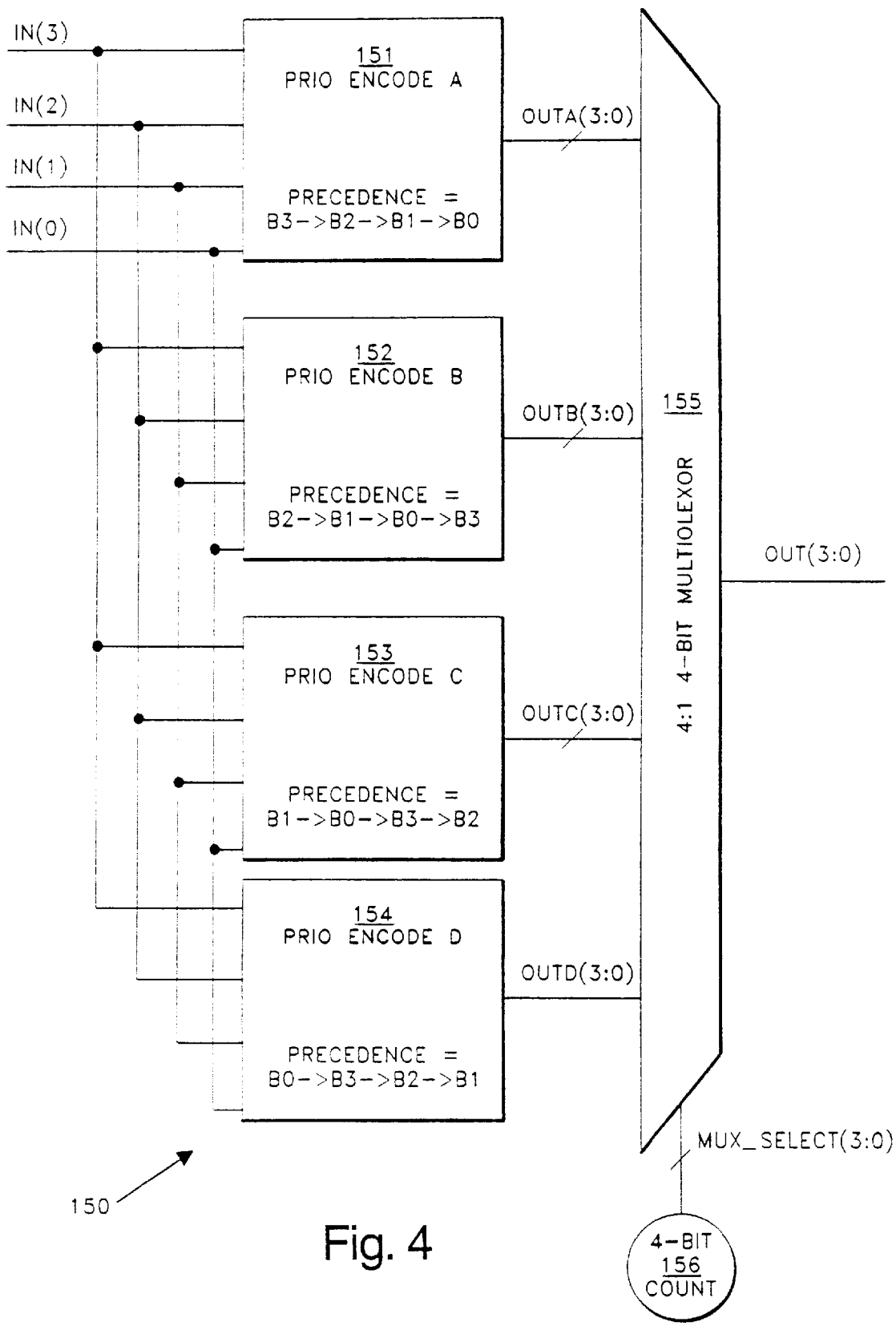
FIG. 4 is a circuit diagram of a variable precedence priority encoder that uses the fixed priority encoders of FIGS. 3a–3d in combination with a multiplexor and a counter in order to select a desired precedence.

A variable precedence priority encoder using the fixed precedence techniques illustrated in FIGS. 3a through 3d can be implemented using physically separate fixed priority encoder circuits for each possible variant of the priority precedence. Such a variable precedence priority encoder 150 is configured as a circuit such as that shown in FIG. 4. The 4-bit variable priority encoder 150 requires four unique fixed priority encoders 151, 152, 153 and 154, each hard-wired with a different input bit having the highest precedence. That is, each of the four encoders 151 through 154 corresponds to one of the encoder circuits shown in FIGS. 3a through 3d, respectively. To allow any one of these fixed priority encoders 151 through 154 to be activated, a four-to-one (4:1) multiplexor 155 controlled by a counter 156 is used to select one of the desired encoder outputs (OUTA through OUTD) for use. As the input vector size increases, however, the priority encoder circuit of FIG. 4 becomes physically large and, therefore, impractical, since each separate fixed priority encoder 151 through 154 must also grow with each input added.

Figure 5:
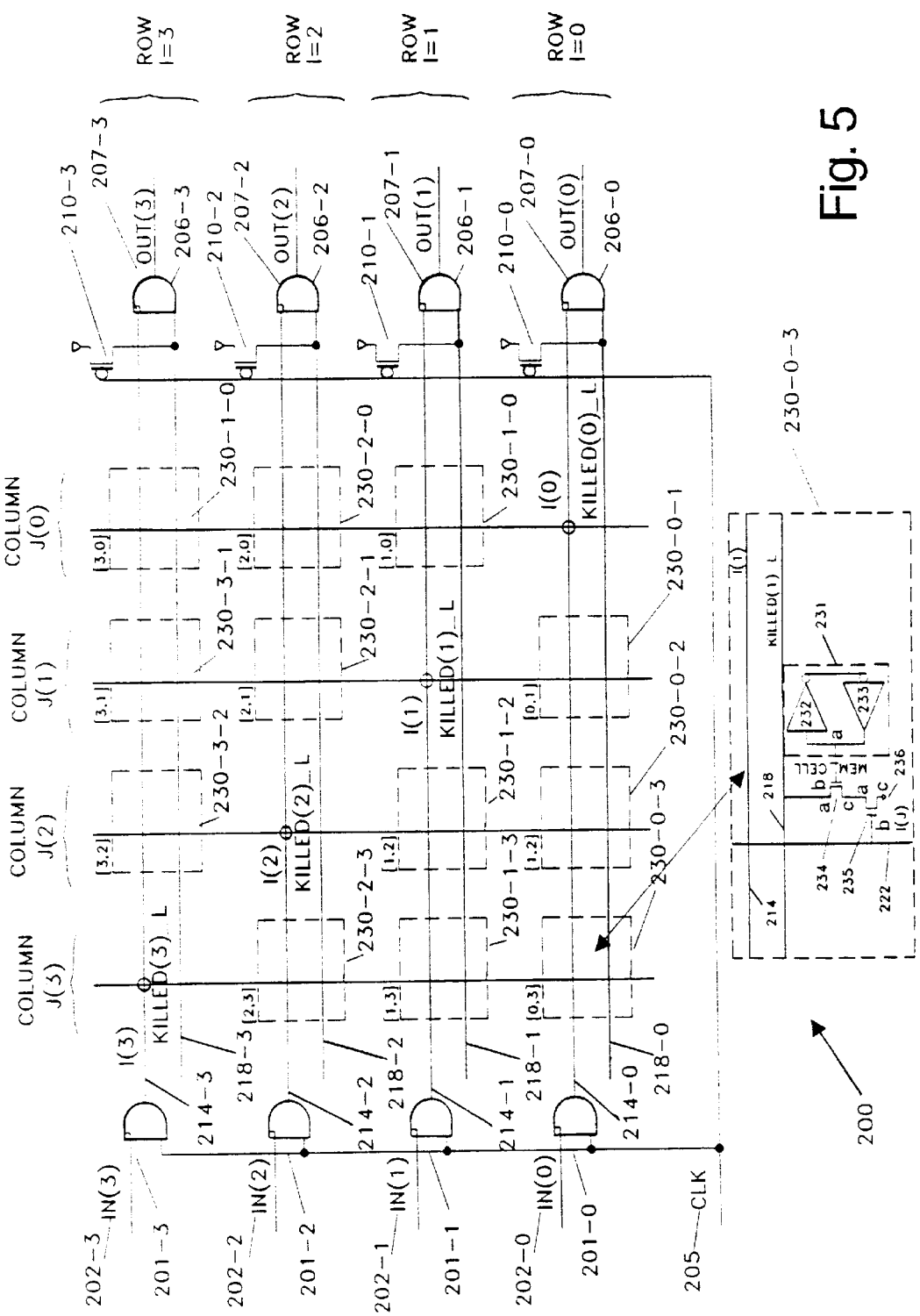
FIG. 5 is a circuit diagram of a four-bit variable precedence priority encoder according to the invention.

FIG. 5 shows an example of a preferred embodiment of a variable precedence priority encoder 200 according to the invention. It is to be understood that the priority encoder 200 receives an input vector of four input bits IN(3), IN(2), IN(1), and IN(0) by way of example only, and that the invention is not limited as such. Rather, the invention is applicable to the implementation of variable precedence priority encoders having any number N, of input bits.

The bit priority, or precedence, of the encoder 200 is variable, or programable, such that each input IN(0) through IN(3), and its corresponding output OUT(0) through OUT (3), which respectively form input/output pairs, may be assigned different priorities. The programmable nature of the priority encoder 200, as will be explained, allows the priority assigned to each input IN(0) through IN(3) to be changed, for example, before each input vector is received. As such, an input/output pair having the highest priority for one input vector may be different for the next received input vector. By providing a programmable priority, the invention allows a single priority encoder 200 to reassign priorities during processing, instead of requiring separate hard-wired priority circuits for each possible configuration.

For purposes of explanation, the encoder 200 is arranged in a grid-like structure having horizontal rows "I" labeled I=0 through I=3, and vertical columns "J" labeled J=0 through J=3. The rows and columns also therefore form grid positions, each having a distinctive coordinate [I,J]. It is noted that the circuit 200 is not limited to being constructed in a grid, and may be arranged in other configurations so long as like connections are established.

In the following discussion of various digital logic circuits the logic true sense is used. For example, an asserted signal is in a logic true or "1" or high voltage state, and a non-asserted signal is in a logic false or "0" or low voltage state.

The priority encoder 200 includes four inputs 202-0 through 202-3, labeled IN(0), IN(1), IN(2), IN(3), a corresponding number of outputs 207-0 through 207-3, labeled OUT(0), OUT(1), OUT(2), OUT(3), AND gates 201-0 through 201-3 (collectively input-AND gates 201), AND gates 206-0 through 206-3 (collectively output-AND gates 206), input-to-output wires 214-0 through 214-3, kill wires 218-0 through 218-3, labeled KILLED(0)_L through KILLED(3)_L, input-to-kill wires 222-0 through 222-3, and kill wire control circuits 230 shown at grid locations labeled with the [I,J] grid coordinates corresponding to rows and columns. Note that there are no kill wire control circuits along the upper-left to lower right center diagonal, that is, grid coordinates [3,3], [2,2], [1,1] and [0,0].

The perpendicular layout of the input-to-output wires 214, the kill wires 218 and the input-to-kill-wires 222, along with the kill wire control circuits 230 at certain intersections of these wires is collectively referred to as the grid or grid circuit.

Inputs 202 each respectively receive a corresponding bit of the input vector. In each I-row, the respective input IN(N) is coupled to a first input of a respective one of the input-AND gates 201. The second input of each input-AND gate 201 is connected to a clock signal (CLK) 205. The output of each input-AND gate 201 is in turn connected to a corresponding input-to-output wire 214. Input-to-output wires 214 each extend along a respective row of the grid and respectively couple to a first input of a corresponding output-AND gate 206. Each output-AND gate 206 receives a second input by coupling to a respective kill wire 218. The kill wires 218 also extend along their respective I-rows. The outputs 207 of each output-AND gate 206 serve as the outputs 207 {i.e., OUT(0) through OUT(3)} of the priority encoder 200.

Each input-to-kill wire 222 extends along the length of a respective J-column of the grid. Each input-to-kill wire 222 couples to a single respective input-to-output wire 214 located in a row having the same row index as the column index of the input-to-kill wire. For instance, the input-to-kill wire 222-3 in column number J=3 couples to input-to-output wire 214-3 for row number I=3, since they have the same row and column indexes. The other input-to-kill wires in the other respective columns have similar connections to a single respective input-to-output wire in a respectively numbered row. As shown, the connection between each input-to-output wire 214 and its corresponding input-to-kill wire 222 forms a diagonal of input-to-kill connections, from the upper left corner of the grid to the lower right corner of the grid (i.e., grid coordinates [0,0], [1,1], [2,2] and [3,3]).

Pre-charge switches 210-0 through 210-3 are also controlled by the clock signal (CLK) 205 in order to switchably connect a reference potential to each kill wire 218. The pre-charge switches 210 may be, for example, a transistor or any other type of electrical switching mechanism. The clock signal 205 serves as a control for each pre-charge switch 210.

As will be explained, the pre-charge switches 210 initialize the state of the priority encoder 200 by placing a reference value, such as a high voltage, on each kill wire 218 prior to receiving the input vector.

In the embodiment shown, since the grid is a four by four grid, there are sixteen different [I,J] grid positions. At each [I,J] position, except where the row and column indexes are equal (i.e, along the center diagonal), a kill wire control circuit 230 is present. As shown, groups of kill wire control circuits 230 are thus coupled along each input-to-kill wire 222. For example, the first group includes kill wire control circuits 230-0-3, 230-1-3 and 230-2-3, the second group includes circuits 230-3-2, 230-1-2 and 230-0-2, the third group includes circuits 230-3-1, 230-2-1 and 230-0-1, and the final group includes circuits 230-3-0, 230-2-0 and 230-1-0.

The individual kill wire control circuits 230 are shown by the dotted lines forming a square surrounding each [I,J] grid position. In this embodiment, all kill wire control circuits 230 contain the same electrical components, but are connected to different respective wires at different respective grid coordinates in the grid.

An exemplary kill wire control circuit 230-0-3, such as the one at grid position [0,3], is shown in detail. The exemplary kill wire control circuit 230-0-3 consists of a kill switch 235, a memory cell 231, and a memory cell switch 234. The memory cell switch 234 has an input 234*a* coupled to the kill wire 218 associated with its respective kill wire control circuit 230, and an output 234*c* coupled to an input 235*a* of the corresponding kill switch 235. The control terminal 234*b* of the memory cell switch 234 is coupled to the output 231*a* of a corresponding memory cell 231. The kill switch 235 has an input 235*a* coupled to the output 234*c* of the memory cell switch 234 and an output 235*c* coupled to a reference voltage 236, such as ground. A control terminal 235*b* of the kill switch 235 is connected to a corresponding input-to-kill wire 222.

Each kill wire control circuit 230 is operated by a respective one of the input-to-kill wires 222 and generally serves as a switch between a single respective kill wire 218 and the reference potential 236.

The example memory cell 231 comprises a pair of back-to-back inverters 232 and 233. In this invention, any type of memory cell structure capable of maintaining either an asserted or deasserted state may serve as the memory cell 231. For example, the memory cell 231 may be coupled to a single reference bit from a semiconductor memory that is not shown in FIG. 5.

In the present invention, the kill wire control circuits 230 provide the encoder 200 with the ability to reassign priorities. This is true because, as will be explained, the memory cell 231 programming controls the existence or lack of an electrical connection between each kill wire 218 and the reference potential 236, if the kill wire control circuit 230 is activated by its input-to-kill wire 222.

That is, if a memory cell 231 is programmed to store a logic true state and provides, for example, a high output, then its corresponding kill wire control circuit 230, if activated via its corresponding input-to-kill wire 222, will couple the reference voltage 236 through switches 234 and 235 to the kill wire 218, thus grounding the kill wire 218 to a low state. Conversely, if the memory cell 231 provides an output in a low state, upon activation of the kill wire control circuit 230 via the input-to-kill wire 222, the kill wire 218 will not be grounded, since memory cell switch 234 will not be turned on by the memory cell 231 to complete the path from the kill wire 218 to the reference potential 236.

During operation of the encoder circuit 200, before an input vector arrives, and when the clock 205 is low, the pre-charge switches 210 are activated to place a high state on each kill wire 218. Thus, since the kill wires 218 are all high, in order for any output 207 to be asserted, its corresponding input 202 and hence its corresponding input-to-output wire 214 must also be in a high state along with the kill wire 218 for that row, since in each I-row, the state of kill wire 218 and the state of the input-to-output wire 214 are AND'ed via output-AND gates 206. However, if any kill wire 218 is brought to a low state, its corresponding row output 207 will be pulled to a deasserted state as well.

Recall that the objective of the priority encoder 200 is to select the highest priority asserted input. Hence, the general concept of the encoder 200 is to allow any input 202 having a higher priority to ground-out the kill wires 218 of all other inputs 202 having a lower priority. The vertical input-to-kill wires 222 allow the distribution of a high input state to the kill wires 218 of input rows having lower priorities than the highest priority input 202 having an asserted state.

Thus, after pre-charging, when the clock 205 enters a logic high state, the input vector bits on inputs 202 are AND'ed with the clock signal 205. Only inputs 202 that are in a high state will have their corresponding input-to-output wires 214 placed in a high state, which places each corresponding connected vertical input-to-kill wire 222 for those asserted inputs in a high state as well. Thus, each kill wire control circuit 230 may or may not have its corresponding vertical input-to-kill wire 222 placed in a high state.

Within each kill wire control circuit 230, when the vertical input-to-kill wire 222 enters a logic high state, the kill switch 235 is activated, providing an electrical coupling from the input 235*a* of kill switch 235 to the output 235*c* coupled to the reference potential 236 (i.e., ground). If a kill wire control circuit 230 is activated in this manner, and, if its memory cell circuit 231 has been programmed with a high state (i.e., contains a one), the memory cell switch 234 is also activated (i.e. by the memory cell itself), at which point both switches 234 and 235 are on and provide an electrical path to reference 236 (i.e., ground) which places the kill wire 218 in a low state. Recall that each kill wire 218 was originally placed in a high state during the pre-charge phase. When a kill wire 218 enters a low state, the output 207 for that I-row will always be deasserted.

Thus, in the variable priority encoder 200, if any input 202 is in a high state, this state will be distributed along the vertical input-to-kill wire 222 associated (i.e., coupled along the diagonal) with that input 202. If an input 202 is assigned the highest priority via a specific programming of memory cells 231 in kill wire control circuits 230, all of the kill wire control circuits 230 along that particular input's associated input-to-kill wire 222 will have been programmed to have a high state in their respective memory cell 231. As such, all of the kill wire control circuits 230 having a "one" in their memory cells 231 which couple to that inputs 202 input-to-kill wire 222 will ground-out the kill wire 218 for the other rows having a lower priority than that input 202. This ensures that all kill wires 218 except for the row of the highest priority asserted input are placed into a low state. Thus, the outputs 207 for the other rows, no matter what the state of their inputs 202, will always enter a low state. The output 207 corresponding to the highest priority asserted input 202, however, will remain asserted, even if the first asserted input is in, for example, the second or third highest priority position.

Thus, by programming an array of bits into the proper memory cells 231 of the proper kill wire control circuits 230, any priority or precedence configuration may be obtained. To enable the encoder 200 to support each of the possible precedence configurations the invention effectively replaces each possible transistor position [I, J] with a kill wire control circuit 230.

Each kill wire control circuit 230 implements the logic expression:

$$\text{KILLED}(I)\_L = \text{NOT}(\text{MEM\_CELL}(I, J) \text{ AND INPUT-TO-KILL}(J))$$

Or in simpler terms, each kill wire control circuit 230 evaluates kill wire 218-I (KILLED (I)_L) to "0" if MEM_CELL (I, J) and input-to-kill wire 222-J are both "1". For the kill wire control circuits 230-I-J where a logical "1" has been stored in the memory cell 231, this evaluates to a function much like a transistor position in the fixed priority encoder of FIGS. 3a through 3d, for each [I,J] grid position that contained a transistor. Specifically, the equation that maps inputs IN to kill wire values KILLED(I)_L is:

$$\text{KILLED}(I)\_L = \text{NOT IN}(J)$$

Or, in simpler terms, a kill wire 218-I is evaluated (i.e., KILLED(I)_L) to "0" if input 202 IN(J) is a "1". For each [I,J] grid position where a logical "0" has been stored in the memory cell 231, this degenerates to:

$$\text{KILLED}(I)\_L = 1,$$

which allows the encoder 200 to create a circuit that is able to emulate any one of the equivalent fixed priority encoders.

Note that the kill wire control circuits 230, are not required along the upper-left to lower-right diagonal of the grid since inputs 202 never need to pull down their own respective kill wires 218.

Thus, the present invention provides the ability to vary the precedence of the priority encoder 200 by storing either a "1" (e.g., high state) or a "0" (e.g., low state) in the appropriate memory cells 231. For example, to enable a precedence such as that described in prior art FIG. 3a, a logical "1" is placed in the memory cells 231 at grid positions [2,3], [1,3], [1,2], [0,3], [0,2] and [0,1]. Likewise, a logical "0" is placed in the memory cells 231 at grid positions [3,2], [3,1], [3,0], [2,1], [2,0] and [1,0].

The precedence of encoder 200 can then be modified by simply placing a different consistent set of logical 1's and 0's in the memory array, with 1's at [I,J] grid positions where a transistor position was required for a given prior art FIG. 3 circuit, and 0's at all other [I,J] grid positions.

In this invention, updating the memory cells 231 can be accomplished in a number of ways. For example, one approach is to sequence through each row of the [I,J] grid, writing a vector of 1's and 0's to each row's appropriate memory cells 231 in order to properly configure the precedence. According to this embodiment, N cycles of the clock 205 are required to sequence through the entire array of memory cells 231 for an input vector size of N. For large arrays this may be somewhat time consuming, but is still advantageous over the prior art since circuit design space is saved and the programmability allows the priority to be changed from one precedence to any other by reprogramming the memory cells 231, without the need for a separate circuit.

As noted above, the priority of the variable priority encoder 200 shown in FIG. 5 may be changed randomly to any other precedence setting, such as from input 202-3 having the highest priority to input 202-1, by reprogramming the memory cells 231. However, the present invention also recognizes that priorities at times are required to be updated or changed according to a predetermined pattern, for instance, when used to select an entry from a queue.

A pattern, such as, for example, a round-robin update scheme, may therefore be used to cyclically update the priority of each input 202-N to the next input 202-N-1, in successive steps. For instance, if input 202-3 has the highest priority, a priority update may require that the next input 202-2 have the highest priority for the next input vector received. Then, on the next successive reception of input vectors, input 202-1 may have the highest priority, and then input 202-0, followed by a return to input 202-3.

This circular or round-robin update scheme can be used with the embodiment of the invention shown in FIG. 5 by successively programming the correct values into the memory cells 231 of each kill wire control circuit 230.

Figure 6:
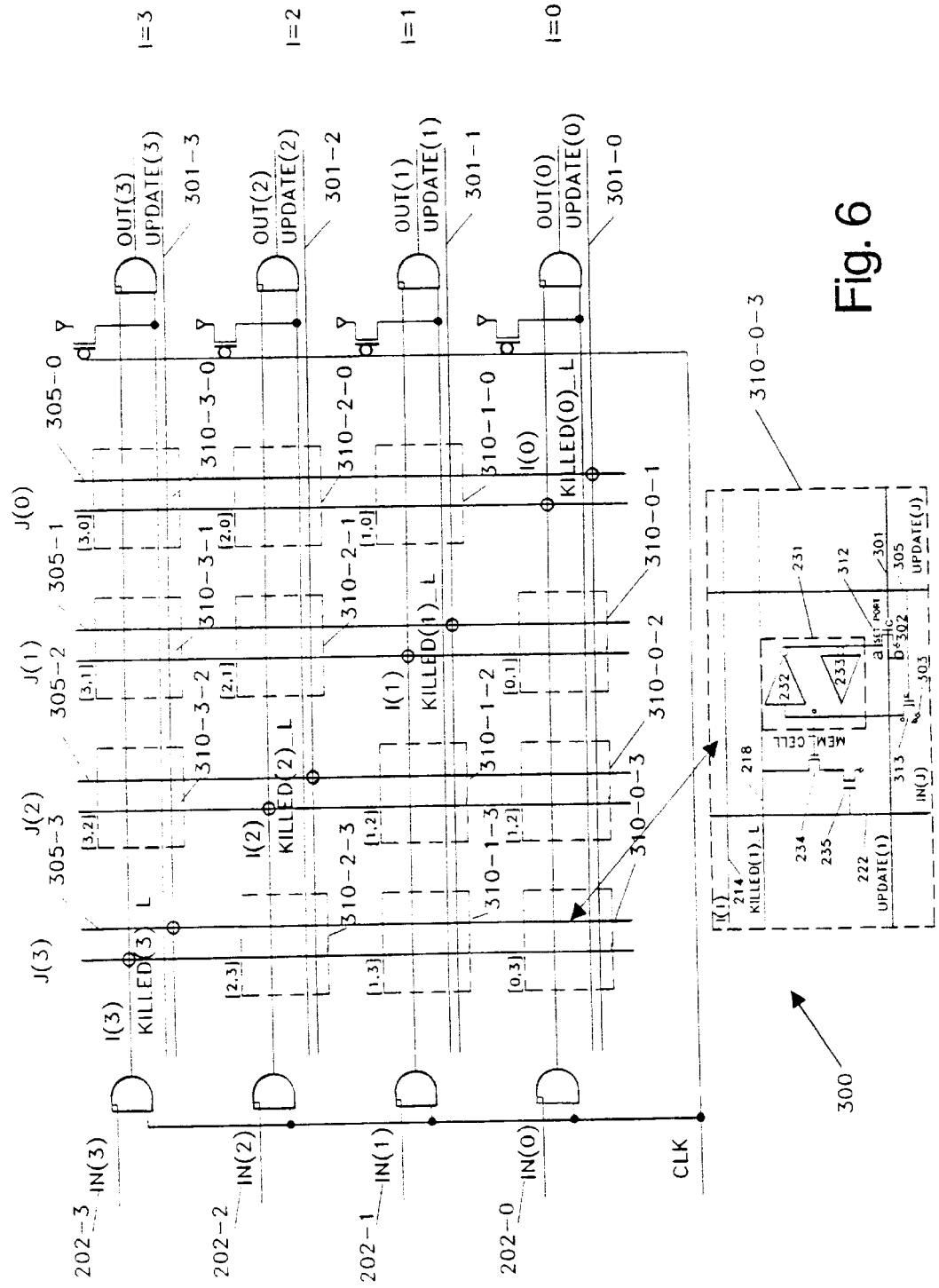
FIG. 6 is a circuit diagram of a four-bit variable precedence priority encoder having a quick update mechanism according to the invention.

FIG. 6 illustrates a mechanism for updating the priorities of an encoder 300 according to a round-robin scheme, for example. The elements of the circuit 300 of FIG. 6 that have the same numbering and/or placement or configuration as the elements of the circuit 200 of FIG. 5 each operate in the same manner as described above. However, in FIG. 6, each I-row also contains an additional row update wire 301-0 through 301-3, and each J-column also contains an additional column update wire 305-0 through 305-3. The row and column update wires 301 and 305 having the same "-N" index are effectively the same wire for purposes of this explanation, since a row update wire 301 is coupled to a corresponding column update wire 305 when the row index is the same as the column index. Thus, the row update wires 301 for rows 0, 1, 2 and 3 are connected to the column update wires 305 for columns 0, 1, 2 and 3, respectively.

Each kill wire control circuit 310 located at each dotted square grid position (i.e., not along the left-top to right-bottom diagonal positions [3,3], [2,2], [1,1], or [0,0]) is configured to allow priority updating via the update wires 301 and 305. This is more particularly shown in the detailed view of an exemplary kill wire control circuit 310 existing at grid position [0,3]. Included in the kill wire control circuit 310 are a set port switch 312 and clear port switch 313, the operation of which allow the memory cell 231 to be either set in an asserted state or cleared to a deasserted state, respectively. Set port switch 312 can write a logical "1" into a given memory cell 231, when activated by row update wire 301, by coupling the memory cell 231 with a high reference voltage 302. Clear port switch 313 can write a logical "0" into memory cell 231, when activated by column update wire 305, by coupling the memory cell 231 with a low reference 303, such as ground. The set port and clear port features of the encoder 300 provide the ability to program the memory cell 231 based on a predetermined manner by successively toggling the row update wires 301 (which also affect the correspondingly connected column update wire 305) in a predetermined order, thus enabling a round-robin priority update scheme.

The invention recognizes that in order to change the priority in a round-robin fashion by one input position only, such as, for example, if changing the precedence from a FIG. 3a circuit configuration to a FIG. 3b circuit configuration (which cannot be done with the prior art circuits), certain [I,J] grid positions maintain their previous value (i.e., maintained the existence or not of transistors from one prior art circuit to the next), namely [I,J] grid positions [2,1], [2,0], [1,2], [1,0], [0,2] and [0,1], while other [I,J] grid positions do not maintain their values (i.e., had transistors removed or added from one configuration to the next).

For example, to obtain the priority shown in FIG. 3b, from the priority shown in FIG. 3a, any [I,J] grid positions along the I-row having the highest priority (except the diagonal positions) in FIG. 3a, that is, row I=3, are all changed to logical "1" positions (i.e., now contain transistors) in FIG. 3b, and [I,J] grid positions along the J-column corresponding to the highest priority in FIG. 3a, that is, column J=3, are all changed to logical "0" positions (i.e., contain no transistors) in FIG. 3b. Specifically, the observation made by this invention is that to go from precedence (b3, b2, b1, b0) to (b2, b1, b0, b3), the memory cell data in grid positions [3,2], [3,1], [3,0] are changed to 1's and the memory cells in grid positions [2,3], [1,3], [0,3] are changed to 0's.

This pattern also holds true for each subsequent round-robin transition of precedence, such as when changing precedence from FIG. 3b to FIG. 3c, FIG. 3c to FIG. 3d and finally FIG. 3d back to FIG. 3a. Stating the observation generally, to change the priority in a round-robin manner by one input position, from a current configuration having input N as the highest priority, to the next input N−1 as the highest priority, change all current row N grid position memory cells 231 having a "0" to a "1", and change all current column N grid position memory cells having a "1" to a "0". It is to be understood that for four inputs 0 through 3, if N=0, the next input number N−1 returns back to 3.

Unlike the prior art, the present invention can implement each of these priority configurations using the encoder 300. Also by using this strategy, as will be explained, the invention is scalable to any number of bits (N) in the input vector.

Accordingly, by connecting each row update wire 301 to the respectively numbered column update wire 305, and then asserting the row update wire 301-N, where N is the row number of the current highest priority row, the memory cells 231 in kill wire control circuits 310 affected by that particular update wire 301 (and the corresponding column update wire 305-N) will be changed to contain the new memory cell values needed for the next priority assignment. That is, to change to the next priority assignment, a controller (not shown in FIG. 6) merely needs to assert the update wire 301 corresponding to the current highest priority row.

The set port switch 312 for a given memory cell 231 has a control 312c connected to the row update wire 301-I associated with the I-row that the memory cell 231 is located. The clear port switch 313 for a given memory cell 231 has a control 313c connected to the column update wire 305-J associated with the J-column in which the memory cell 231 is located. Thus, in any one kill wire control circuit 310, in a given cycle, only one update wire 301 or 305, if any, will be used to either set or clear the memory cell 231.

The set and clear decision for each grid position is performed according to the precedence shifting observation made above. For example, to change the precedence from that of FIG. 3a to FIG. 3b, only row update wire 301-3 needs to be asserted, enabling the set port switch 312 in grid positions [3,2], [3,1], [3,0] (i.e., placing a "1" in the corresponding memory cells 231) and enabling the clear port switch 313 in grid positions [2,3], [1,3] and [0,3] (i.e., placing a "0" in those memory cells 231). Because no other row update wires 301 are asserted, all other [I, J] positions remain unchanged. Then, to change the precedence again, this time from FIG. 3b to FIG. 3c, only row update wire 301-2 needs to be asserted, enabling the set port switch 312 in grid positions [2,3], [2,1], [2,0] and enabling the clear port switch 313 in grid positions [3,2], [1,2] and [0,2]. Then, for the next change in precedence, row update wire 301-1 is asserted, then row update wire 301-0, and so on.

In this manner, by asserting the row update wires 301 in order, the priority can be updated in a round-robin fashion. The implementation of FIG. 6 thus enables the precedence of the variable priority encoder 310 to be updated in a round-robin fashion very quickly, at a rate of one update per clock cycle, and without the need to individually program each memory cell 231 as in the embodiment shown in FIG. 5. The encoder circuit 300 also scales to large input vector sizes with no delay impact other than the additional fanout of the various wires.

The embodiment of FIG. 6 can be easily extended to other round-robin schemes which can update precedence by more than one priority position per clock cycle. For example, for a round-robin scheme which can shift the precedence by as much as two input bit positions in a single clock cycle, the present invention can use two row and column update wires per kill wire control circuit. FIG. 7 illustrates an example embodiment of such an encoder 400. The encoder 400 is very much like that of FIG. 6, except that additional or second row and column update wires 401 and 405 have been added to the circuit. Another difference, as will be explained, is a variation made to the kill wire control circuits labeled 510 and 610. In kill wire control circuits 410, update wires 301 and 305 are connected as previously described. The second row update wires 401-0 through 401-3 couple to the second column update wires 405-0 through 405-3 along their respective diagonal coordinates, so that a second row update wire 401 is coupled to a second column update wire 405 when the two wires have equal column and row indexes. Thus, row update wire 401-0 couples to column update wire 405-0, row update wire 401-1 couples to column update wire 405-1, and so forth.

The details of an exemplary kill wire control circuit 410-0-3, from grid location [0,3], are also shown in FIG. 7. The set port switch 312 and the clear port switch 313 are connected as in FIG. 6. However, the second row update wire 401 couples to the control 412c of a second set port switch 412, and the second column update wire 405 couples to the control 413c of a second clear port switch 413. As explained previously with respect to set and clear port switches 312 and 313, the additional set port switch 412, when activated, stores a high state into memory cell 231, and the additional clear port switch 413, when activated, stores a low state into memory cell 231.

Encoder 400 allows-priorities to be updated by up to two input positions 202 in one clock cycle by merely asserting one row update wire 301 for the row with the current highest priority and a second row update wire 401 in the row having the second highest priority. Thus, with respect to FIGS. 3a through 3d, the present embodiment of the invention allows a precedence configuration such as that shown in FIG. 3a (where a transistor represents a "1" in the memory cell 231 of the kill wire control circuit 410 of this embodiment) to be directly switched to the configuration of FIG. 3c, in one clock cycle.

However, the invention also may exploit a unique distinction in the transistor location changes which are two precedence configurations apart from each other. In particular, certain grid positions in the lower left area of the grid, that is, positions [1,3], [0,3] and [0,2] are inverted when comparing the configuration of FIG. 3a to that of FIG. 3c. Likewise, the upper right area of the grid, that is, positions [3,1], [3,0] and [2,0] are inverted when switching to the precedence configuration of FIG. 3a to 3c. However, the [I,J] grid positions along the upper and lower diagonals above and below the center diagonal, running from the top left to the bottom right corner, are not simply inverted when shifting priority by two input positions. That is, grid positions [2,3], [1,2] and [0,1], that form the lower diagonal below the center diagonal, and grid positions [3,2], [2,1] and [1,0], that form the upper diagonal above the center diagonal, have a conflict such that each grid location may not be simply inverted by one update wire 301, and then inverted again by the second update wire 401 to update the precedence by two bit positions.

Stated in another manner, when doing a precedence shift of two, the diagonals directly above and directly below the center diagonal will have a set/clear conflict between the row update wires 301 and 401 and the column update wires 305 and 405, within the same kill wire control circuit 410. That is, within a single kill wire control circuit at these conflicting locations, when performing an update of two bit positions, one update wire will be trying to set the memory cell 231 and another will be trying to clear it.

To solve this conflict so that the appropriate values are placed into the memory cells 231 at these locations when shifting priority by two input positions, the upper diagonal conflict positions [3,2], [2,1] and [1,0] are implemented to always require that the clear port switch 413 connected to the column update wire 405 win over the set port switch 312 coupled to the row update wire 301, while the lower diagonal conflict positions [2,3], [1,2] and [0,1] always require that the set port switch 412 connected to the row update wire 401 win over the clear port switch 313 coupled to the column update wire 305.

What is meant by "win" is that, for example, when one update wire (either 401 or 405) is trying to clear or set a memory cell 231, and another (the other of update wire 301 or 305) is trying to do the opposite set or clear operation, the wire that "wins" will be allowed to perform its set or clear operation. Hence, there are separate configurations for kill wire control circuits 410, 510 and 610.

The conflict that exists for the kill wire control circuits 410 in the upper and lower diagonals of FIG. 7 is resolved by not connecting the upper diagonal conflicting grid position set port switch 312 to the row update wire 301, and, on the lower diagonal conflicting grid positions, not connecting the clear port switch 313 to the column update wire 305.

Figure 8:
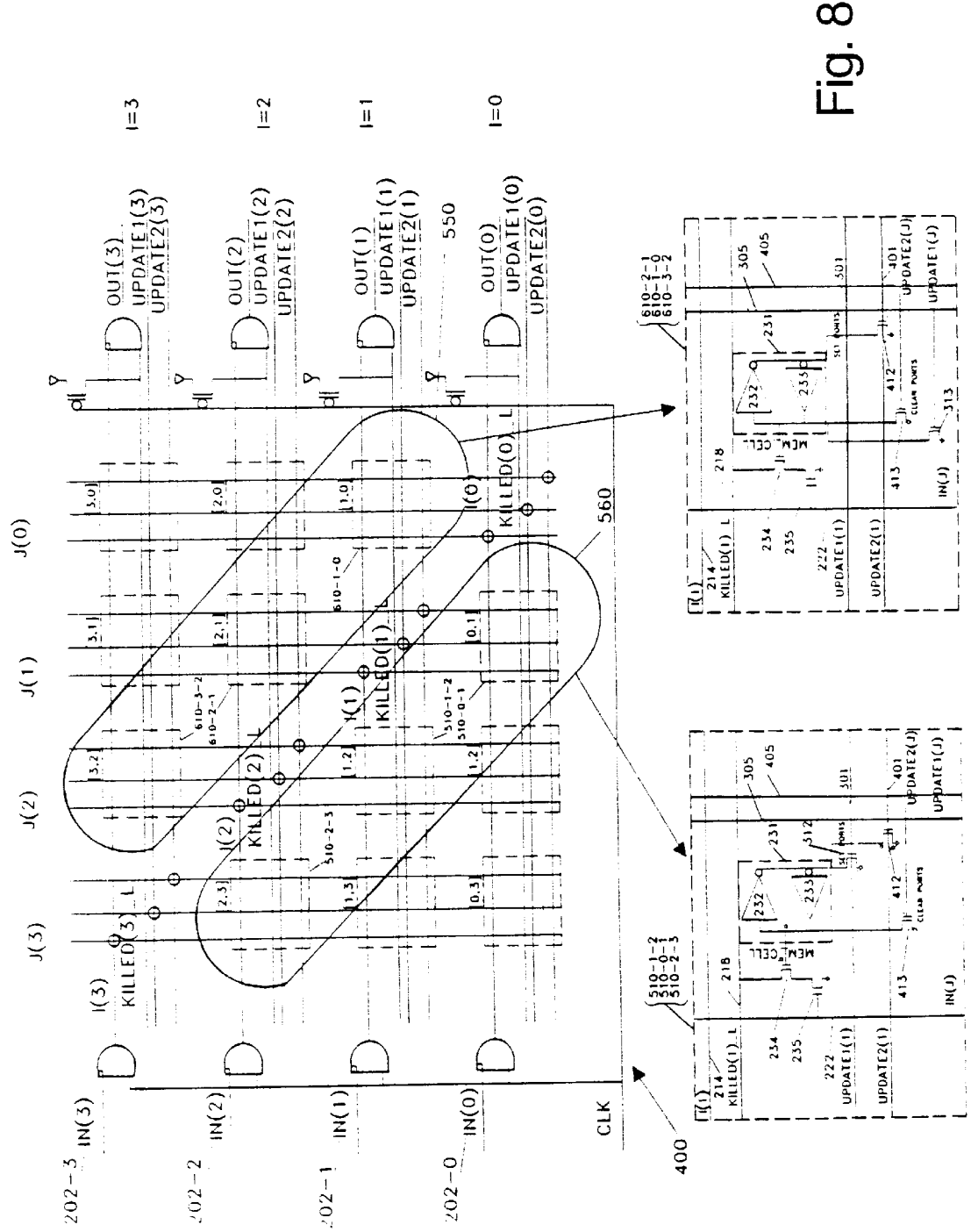
FIG. 8 is a circuit diagram illustrating the details of a special configuration for kill wire control circuits for the upper and lower diagonals of the embodiment of FIG. 7.

FIG. 8 shows the configurations of the different kill wire control circuits 510-1-2, 510-0-1 and 510-2-3 and 610-2-1, 610-1-0 and 610-3-2 for each of conflicting grid positions along the upper and lower diagonals 550 and 560, respectively. Each kill wire control circuit 510 in the lower diagonal 560 having grid positions [2,3], [1,2] and [0,1], as shown, does not contain a clear port switch (313 in FIG. 7) connected to the column update wire 305. Thus, in conflicting grid positions along the lower diagonal 560, if the row update wire 401 is asserted while the row update wire 301, and hence, its corresponding column update wire 305 are also asserted, the row update wire 401 will always be allowed to win by setting a "1" in the memory cell 231. Likewise, each kill wire control circuit 610 in the upper diagonal 550 having grid positions [3,2], [2,1] and [1,0], as shown in the figure, does not contain a set port switch (312 in FIG. 7) connected to the row update wire 301. Thus, in the upper diagonal 550, if the row update wire 401, and hence, its corresponding column update wire 405 are asserted, while the row update wire 301 is also asserted, the column update wire 405 will always be allowed to win by setting a "0" (i.e., clearing) into the memory cell 231.

In FIG. 7, in order to update the precedence by 1 input position, only row update wire 401 of the current highest priority row is asserted. Row update wire 301 is asserted in the current highest priority row if a precedence shift of two input positions 202 is performed. Additionally, row update wire 401 is asserted in the second highest priority row. Thus, if a priority shift of two input positions 202 is performed, both row update wires 301 of the current highest priority row and 401 of the second highest priority row are asserted. Conflicts in the upper and lower diagonals 550 and 560 do not occur due to the removal of the appropriate clear or set port switches, as explained above.

The technique of using multiple update wires may be extended to precedence shifts of three or more input positions. To do so, another row and column update wire is merely added to each kill wire control circuit, one for each extra precedence shift desired. Thus, to shift five input positions, five row and column update wires would be required, and the four upper and lower diagonals extending from the center would need to have conflicts resolved. Where conflicts occur, the appropriate set or clear port switches can be removed from the kill wire control circuits in order to provide a proper circuit configuration which correctly sets the memory cell.

Generally, in embodiments where the priority can shift by more than two input positions, the number of each set and clear port switch increases by one per memory cell as the number of priority positions desired to be shifted increases, and updating priorities is analogous to the round-robin scheme described above.

This invention may thus be extended, for example, to a variable precedence priority encoder having ten or more inputs, and can provide the capability to implement priority shifts of three, four and five or more input positions. However, as more update wires are added, the conflicts will occur on upper and lower diagonals further and further from the center.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A variable precedence priority encoder apparatus comprising:

a plurality of inputs, each receiving a corresponding bit of an input vector;

at least one output, the output providing an indication of the state of a highest priority one of the inputs which is asserted; and a priority assignment circuit coupling each input to its associated corresponding output, the priority assignment circuit assigning a priority to each input, the priority assigned such that the output which corresponds to the input which receives an asserted bit, and which input has a highest priority of all asserted inputs, can be dynamically changed.

2. The apparatus of claim 1 wherein the priority assigned to each input may be shifted by the priority assignment circuit by at least one input position in a given clock cycle.

3. The apparatus of claim 2 wherein:

the at least one output comprises a plurality of outputs such that each output is associated with a corresponding one of the inputs, to form a like plurality of input/output pairs; and the output is asserted which corresponds to the input which is asserted and which has a highest priority of all asserted inputs, while all other outputs are not asserted.

4. The apparatus of claim 3 having N input/output pairs having positions 0 through N−1, wherein the priority assignment circuit further comprises:

N input-to-output wires, one input-to-output wire associated with each input/output pair and having an input-to-output position the same as a position of the associated input/output pair, each input-to-output wire coupling the associated input to the associated output of its associated input/output pair;

N kill wires, one kill wire associated with each input/output pair and having a kill position the same as the position of the associated input/output pair, each kill wire being coupled to the output of the associated input/output pair; and N input-to-kill wires, having input-to-kill positions 0 through N−1, each input-to-kill wire coupled to an input-to-output wire having an input-to-output position corresponding to the input-to-kill position of the input-to-kill wire to which it is coupled.

5. The apparatus of claim 4 further comprising:

a plurality of kill wire control circuits, groups of which are coupled along each input-to-kill wire, wherein each kill wire control circuit in a group couples its respective input-to-kill wire to de-assert a respective kill wire upon activation, such that there are separate kill wire control circuits coupled along each input-to-kill wire and coupled to every kill wire having a kill position that does not correspond to the input-to-kill position of the group's respective input-to-kill wire, and coupled only to kill wires having kill positions the same as the positions of associated input/output pairs in which the input of the associated input/output pair has a lower priority than the input associated with the respective input-to-kill wire.

6. The apparatus of claim 5 wherein each kill wire control circuit further asserts or de-asserts the kill wire to which it is coupled based upon a state of the input-to-kill wire to which it is coupled and based upon a state of a memory cell within the kill wire control circuit.

7. The apparatus of claim 5 wherein each kill wire control circuit further comprises:

a memory cell, capable of maintaining an asserted state and a deasserted state, the asserted and deasserted states being mutually exclusive of one another at any one time, such that the memory cell is in only one such state at any one time and the memory cell is connected to control the state of a corresponding kill wire to which a corresponding kill wire control circuit is coupled in conjunction with the state of the input-to-kill wire coupled to that kill wire control circuit, such that if the input-to-kill wire is asserted, and the memory cell contains an asserted state, the corresponding kill wire will enter a deasserted state.

8. The apparatus of claim 7 wherein the memory cell additionally comprises:

a memory cell switch having an input coupled to the kill wire, a control coupled to an output of the memory cell, and an output;

a kill switch having an input coupled to the output of the memory cell switch, a control coupled to the respective input-to-kill wire, and an output coupled to a reference potential; and wherein when the input-to-kill wire is asserted, the kill switch is activated allowing the memory cell to activate the memory cell switch, such that if the output of the memory cell is in an asserted state, the kill wire is placed in a deasserted state.

9. The apparatus of claim 7 wherein when a kill wire is placed in a deasserted state, the corresponding output having the same position as the kill wire position of that kill wire is placed in a deasserted state.

10. The apparatus of claim 7 further comprising:

a plurality of update wires, at least one update wire associated with each input/output pair and coupled to each memory cell of kill wire control circuits having the same row and column positions as that input/output pair, each update wire permitting the programming of asserted and deasserted states into the memory cell of a respective kill wire control circuit, such that certain kill wire control circuits are in asserted states and certain other kill wire control circuits are in deasserted states, and such that the priority assigned to each input is updated by at least one precedence to a different priority than a previous priority by asserting at least one of the at least one update wire associated with the input/output pair having the highest priority.

11. The apparatus of claim 10 wherein the at least one update wire comprises at least two update wires and the priority assigned to each input is updated by at least two precedences to a different priority than a previous priority.

12. A method for changing the priority of a variable precedence priority encoder having a plurality of inputs, a like plurality of outputs associated with each input, and a plurality of kill wire control circuits each containing a memory cell capable of being placed in an asserted and deasserted state, the method comprising the steps of:

providing an array of memory bits, one bit corresponding to each memory cell of the plurality of kill wire control circuits;

receiving an input vector of bits in asserted and deasserted states, one bit per individual ones of the plurality of inputs; and providing an output in an asserted state, with all other outputs in a deasserted state, wherein the output in the asserted state is selected from among the inputs in an asserted state and based upon the priority of precedence as established from the step of providing an array of memory bits.

13. The method of claim 12 further comprising the step of:
pre-charging the priority encoder to initialize each of the like plurality of outputs.

14. A single circuit priority encoder comprising:
means for receiving an input vector including a priority of input bits;
a priority assignment circuit, coupled to the means for receiving the input vector, wherein the priority assignment circuit is configured to assign a highest priority to a certain input bit of the input vector, and to assign successively lower priorities to other input bits of the input vector;
means, coupled to the priority assignment circuit, for providing an indication of a single bit of the input vector that is asserted and is in a higher priority bit position than any other asserted bit in the input vector; and
means for changing the priority assigned to the bits of the input vector by at least one bit position.

15. The encoder of claim 14 wherein the means for changing the priority assigned to the bits of the input vector can change the priority by two or more bit positions.

16. The single circuit priority encoder of claim 14 wherein the means for changing the priority assigned to the bits of the input vector can change the priority in a round-robin manner.

17. The single circuit priority encoder of claim 14 wherein the priority encoder is used within a data processing device for selecting queue entries of varying precedence.

18. A variable precedence priority encoder comprising:
N inputs;
N fixed priority encoder circuits each coupled to receive the N inputs, each priority encoder having a different hard-wired priority, such that each one of the N fixed priority encoder circuits has a predetermined precedence that selects a different input of the N inputs as an input having the highest priority and being asserted;
a selector selecting any one of the N fixed priority encoders as the active fixed priority encoder; and
an output coupled to the selector, for providing an indication of which one of N inputs provided to the selected active fixed priority encoder is the input having the highest priority for that active fixed priority encoder and which is in an asserted state.

* * * * *